S. DENNIS.
Device for Transmitting Motion.

No. 218,500. Patented Aug. 12, 1879.

WITNESSES:
Henry N. Miller
C. Sedgwick

INVENTOR:
S. Dennis
BY Munn & Co
ATTORNEYS.

UNITED STATES PATENT OFFICE.

STEPHEN DENNIS, OF BOGOTA, UNITED STATES OF COLOMBIA.

IMPROVEMENT IN DEVICES FOR TRANSMITTING MOTION.

Specification forming part of Letters Patent No. 218,500, dated August 12, 1879; application filed July 3, 1879.

*To all whom it may concern:*

Be it known that I, STEPHEN DENNIS, of Bogota, in the United States of Colombia, have invented a new and Improved Device for Transmitting Motion, of which the following is a specification.

Figure 1:
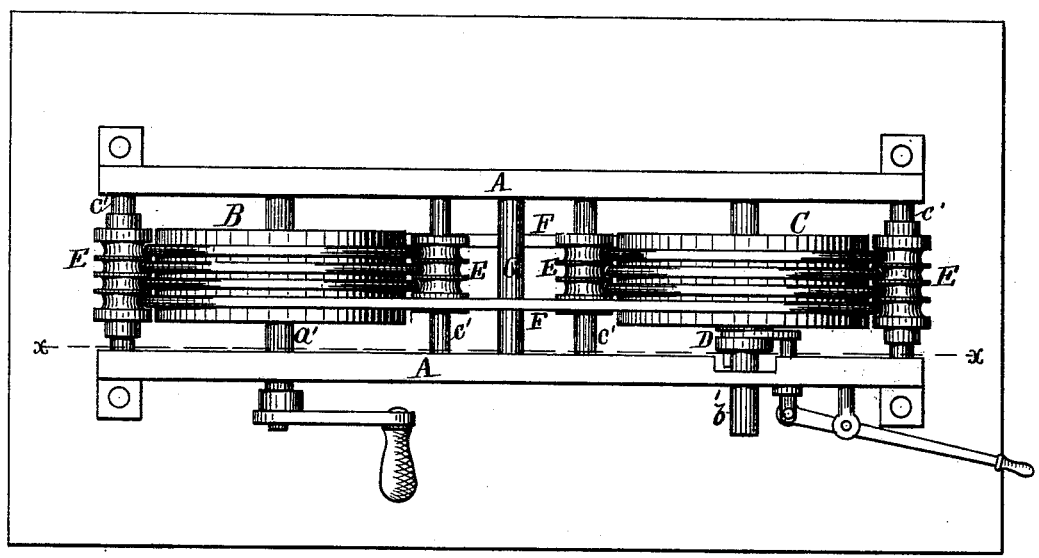
Figure 2:
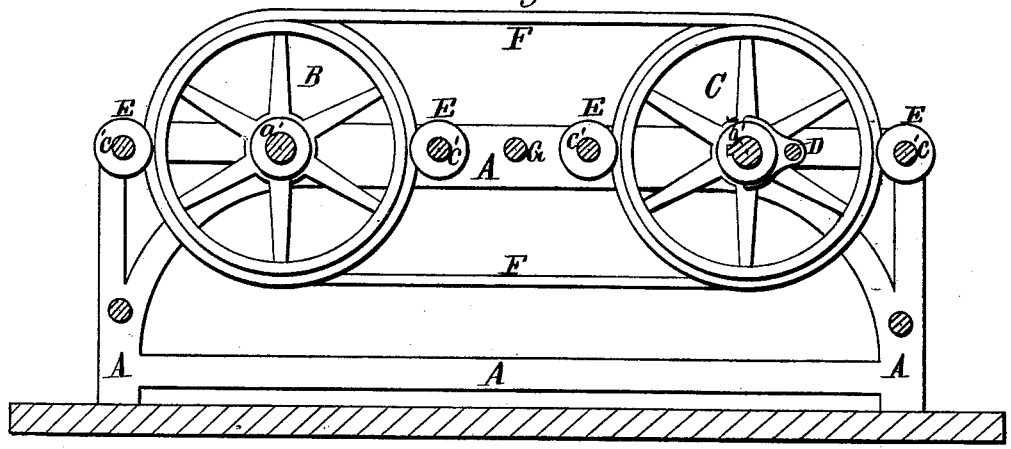
Figure 3:
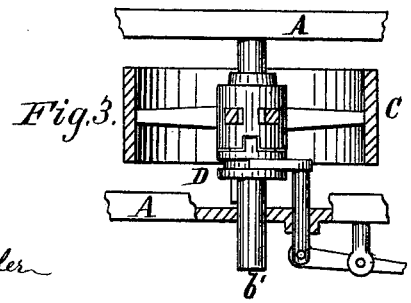

Figure 1 is a plan of the device. Fig. 2 is a sectional side elevation of the same on line $x\ x$, Fig. 1. Fig. 3 is a sectional plan of loose pulley and clutch.

Similar letters of reference indicate corresponding parts.

The object of this invention is to transmit rotary motion with a minimum loss by friction, and without the intervention of belts, gearing, and the like.

The invention consists of two pulleys, one on the driving and the other on the driven shaft, that are connected by an endless cord, rope, or chain, which makes one or more turns or coils around each, and is drawn to the ordinary tension of a driving-belt, while in front and rear of each pulley, and nearly in contact with their faces, are fixed grooved rollers, either running loosely on shafts or keyed on freely-revolving shafts, each one of whose grooves covers a turn or coil of the cord or rope, and thus keeps it in its perpendicular plane and prevents the cord or rope from running off at the side of the pulley.

It will be obvious that by this device power can be transmitted from one point to another without the friction incident to the use of belts and without the loss of power attendant upon the invariable slipping of belts when running at any but very low speeds. Indeed, it has been fully demonstrated that an economy of from twenty to twenty-five per cent. of power—which is convertible into like saving in fuel—may be assured by substituting this non-slipping power-transmitter for the ordinary device of the belt.

It will be seen, too, that by the aid of the grooved rollers power can, with equal ease, be transmitted from a horizontal to a vertical shaft, or vice versa, thus enabling one to dispense with the use of gear-wheels, and that this power can be transmitted to any distance whatever with less loss of the original force than by any other means.

In the drawings, A represents the frame supporting the working parts of the device. B is the driving-pulley; and C the driven pulley, the former keyed to the shaft $a'$ while the latter runs loosely on the shaft $b'$, but can be thrown in gear by the action of the clutch D, that is keyed on the shaft $b'$. E E are the grooved rollers on shafts $c'\ c'$.

The cord, rope, or chain F is turned, it is seen, several times around the pulleys B and C, and its tendency to run sidewise off the faces of the pulleys is checked by the grooves of the rollers E E, in which the turns or coils of the cord or rope run, and the rollers revolve so freely that there is no appreciable friction between them and the cord.

G is a cross-bar for stiffening the frame.

The simplicity, effectiveness, and durability of this device must be obvious to all who have had experience with the common belt and cog-wheel systems.

Having thus described my invention, I claim as new and desire to secure by Letters Patent—

1. The within-described device for transmitting motion consisting of frame A, supporting the shafts $a'$, $b'$, and $c'\ c'$, pulleys B and C, clutch D, grooved rollers E E, and cord, rope, or chain F, constructed and arranged substantially as and for the purpose described.

2. A device for transmitting motion, in which an endless cord, rope, or chain is coiled one or more times around both driving and driven pulleys, and held in place by grooved rollers fixed in contact with it, substantially as herein shown and described.

3. The combination of pulleys B and C and cord, rope, or chain F with the grooved rollers E E, revolving in the same plane with the pulleys, substantially as herein shown and described.

STEPHEN DENNIS.

Witnesses:
L. L. STORER,
C. SEDGWICK.